March 19, 1963

R. E. ORTON 3,082,043

TRACK ADJUSTING SYSTEM

Filed April 3, 1961

INVENTOR.
RAYMOND E. ORTON

BY

Teare, Fetzer & Teare
ATTORNEYS

March 19, 1963   R. E. ORTON   3,082,043
TRACK ADJUSTING SYSTEM

Filed April 3, 1961   3 Sheets-Sheet 2

INVENTOR.
RAYMOND E. ORTON
BY
Teare, Felzer & Teare
ATTORNEYS

March 19, 1963 — R. E. ORTON — 3,082,043
TRACK ADJUSTING SYSTEM
Filed April 3, 1961 — 3 Sheets-Sheet 3

INVENTOR.
RAYMOND E. ORTON
BY
Teare, Felzer & Teare
ATTORNEYS

United States Patent Office
3,082,043
Patented Mar. 19, 1963

3,082,043
TRACK ADJUSTING SYSTEM
Raymond E. Orton, Cleveland, Ohio, assignor to The Cleveland Trencher Company, Cleveland, Ohio, a corporation of Ohio
Filed Apr. 3, 1961, Ser. No. 100,315
2 Claims. (Cl. 305—10)

This invention relates in general to a system for adjusting the endless belt tracks of a tractor-like mechanism, and more particularly to a fluid powered system for adjusting the endless tracks of an excavating machine and the like.

Most self-propelled vehicles or equipment using crawler tracks or belts, such as for instance trenching machines, back fillers, shovels, tractors and the like, have the problem of relieving excessive track tension, when, for instance, caused by obstructions that may wedge between the track and the idler wheels or drive sprockets of the crawler track mechanism.

In present day practice it is known in excavating machines, back fillers, and the like to have embodied therewith a fluid control system or systems for actuating and controlling various, generally hydraulic, motor units, which in turn actuate and control various components of the mechanism or machine, thereby providing a hydraulic or fluid powered machine capable of increased usability in the operations to which the machine is adapted for use. Some of the working components of excavating machines which are conventionally actuated and controlled by hydraulic motor units in present day practice are the discharge conveyor of the machine and its shifting movements to its various work positions, and for actuating the endless belt of the conveyor for moving the excavated material it receives from the excavating unit of the machine to a side of the excavation. Also, the crumbing mechanism which is conventional on most mobile trenching machines for propelling the material in a trench forwardly toward the digging unit thereof has recently been powered by a hydraulic, reciprocal motor unit, to greatly increase the usability of such crumbing mechanism, and increase the maneuverability of the excavating machine as a whole.

The present invention provides a novel, fluid actuated track adjusting system which may be operative to automatically adjust the crawler tracks of the machine upon actuation of any of the other fluid powered mechanisms of the machine, as by actuation of control valve means for actuating such other mechanisms, to thus automatically maintain the crawler tracks in adjusted and proper tensioned condition. However, the system embodies pressure relief means so that if excessive track tension occurs in the crawler treads, such as may happen if obstructions wedge between the track rail and the idler wheels, or the links of the tracks become packed with mud, the pressure will build up in the system and open the pressure relief means, thus slackening up on the track and preventing failure thereof.

Accordingly an object of the invention is to provide a novel fluid actuated track adjusting system for crawler mounted equipment.

Another object of the invention is to provide a novel track adjusting system for crawler supported equipment, such as mobile trench excavating machines, back filling machines and the like, wherein such system embodies hydraulic actuated cylinder mechanism coacting with the idler wheels of the track mechanism, for automatically maintaining a predetermined tension in the crawler tracks, and wherein the system embodies pressure relief means which will become actuated when the pressure in the system builds up beyond a predetermined maximum, to thus slacken up on the track and prevent failure thereof.

A still further object of the invention is to provide a novel, hydraulic actuated track adjusting system for crawler mounted machines wherein such system is simple to actuate and control and which will operate effectively to automatically adjust tension in the crawler tracks.

Other objects and advantages of the invention will be apparent from the following description taken in conjunction with the accompanying drawings wherein:

FIG. 3 is an enlarged, vertical sectional view taken generally along the plane of line 3—3 of FIG. 2, looking in the direction of the arrows;

FIG. 4 is a vertical sectional view taken generally along the plane of line 4—4 of FIG. 2, looking in the direction of the arrows;

Referring now again to the drawings, the fluid actuated track adjusting system is adapted for application to any crawler mounted machine, such as for instance a mobile trenching machine, back filling machine, tractors, and the like. Reference may be had to the United States Patent No. 2,483,170 issued September 27, 1949 to Albert R. Askue which illustrates a type of mobile trenching machine to which the present invention may be applied. Reference may also be had to United States Patent No. 2,908,091 issued October 13, 1959 to John W. Spring which illustrates a mobile trenching machine embodying a fluid actuated and controlled component, and more particularly a fluid actuated crumbing shoe for the machine.

Figure 1:
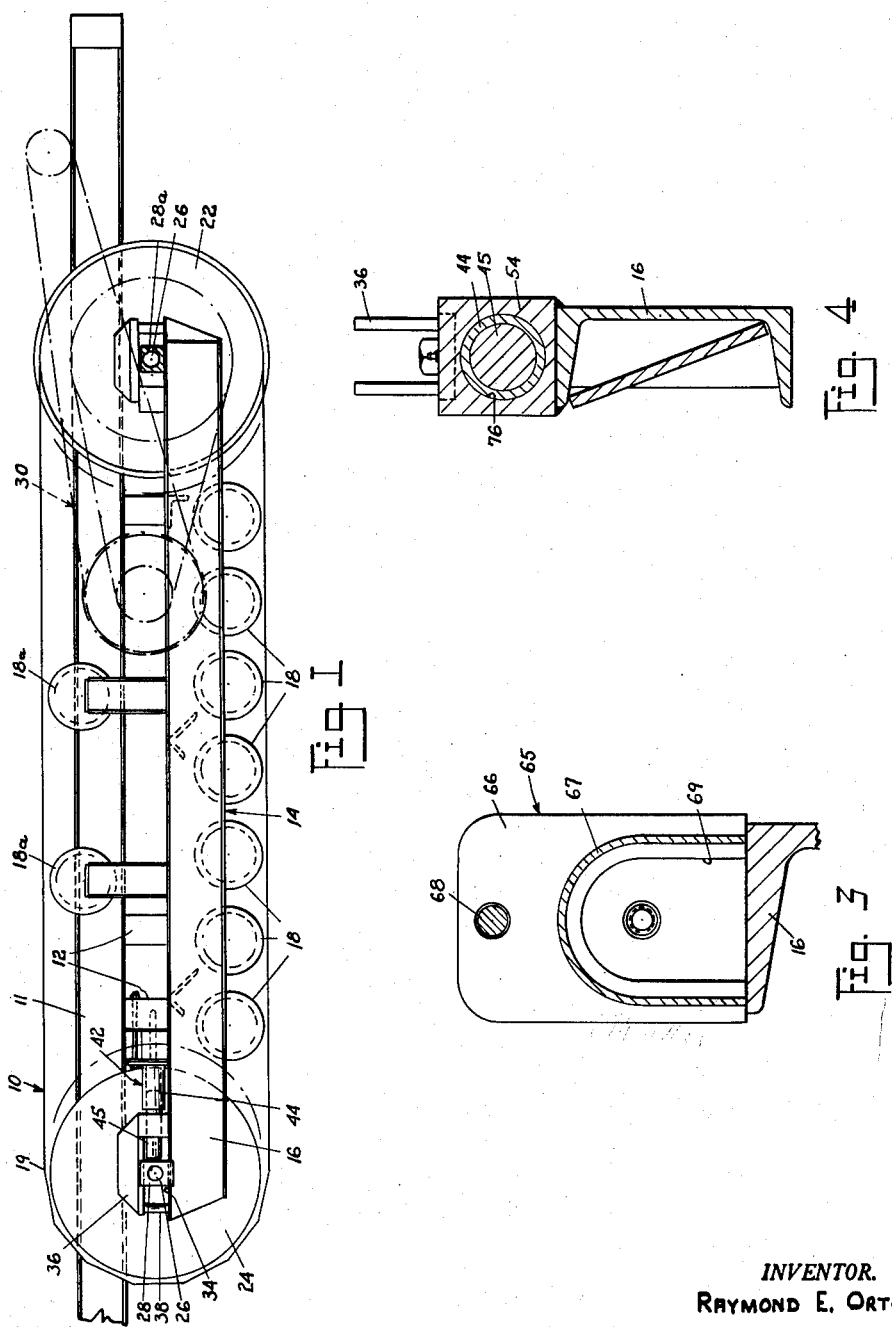
FIG. 1 is a fragmentary, side elevational view of one side of a crawler mounted machine particularly illustrating in generally diagrammatic form, the crawler track mechanism thereof, and embodying the fluid actuated track adjusting system of the invention.

Referring now to FIG. 1, there is illustrated the crawler track mechanism 10 for an excavating machine. The frame 11 of the machine includes transversely extending frame members 12, the outer ends of which are supported on lengthwise extending frame assembly 14 of the crawler belt assembly. It will be understood, of course, that there is a crawler belt assembly disposed on both sides of the machine, only one of such crawler belt assemblies being illustrated in FIG. 1. Frame assembly 14 comprises a pair of transversely spaced, longitudinally extending structural members 16, between which a plurality of flanged, lower crawler track engaging wheels 18 are rotatably mounted. Upper crawler track engaging wheels 18a are also provided in the conventional manner. The wheels 18, 18a engage links of the track 19, which links are pivotally secured together as by means of pins, to form the conventional crawler track or belt.

Each crawler belt 19 is looped about and supported by longitudinally spaced drive socket member 22 and idler pulley member 24 which are rotatably mounted on a respective shaft 26. The ends of these shafts are mounted in paired block-type members 28, 28a at opposite ends of the respective crawler frame assembly 14. Blocks 28a are generally fixed in position on the respective frame member 16. The crawler tracks or belts are suitably driven from the prime mover of the machine, which generally constitutes an internal combustion engine, and may be operably coupled thereto as by means of conventional sprocket and chain drive arrangements generally referred to by reference numeral 30 which is operatively connected to the respective drive sprocket member 22.

Now in accordance with the instant invention, transversely spaced bearing blocks 28 which support the shaft 26 of the idler wheel 24 are slidably mounted for relative lengthwise movement on the respective frame member 16. In this connection it will be seen that each of blocks 28, positioned on opposite sides of the idler wheel, is disposed in an elongated slot 34 defined by the respective inverted U-shaped structure 36 and by the associated frame member 16. The outer end 38 of said U-shaped structure forms a stop for a purpose to be hereinafter set forth.

Figure 2:
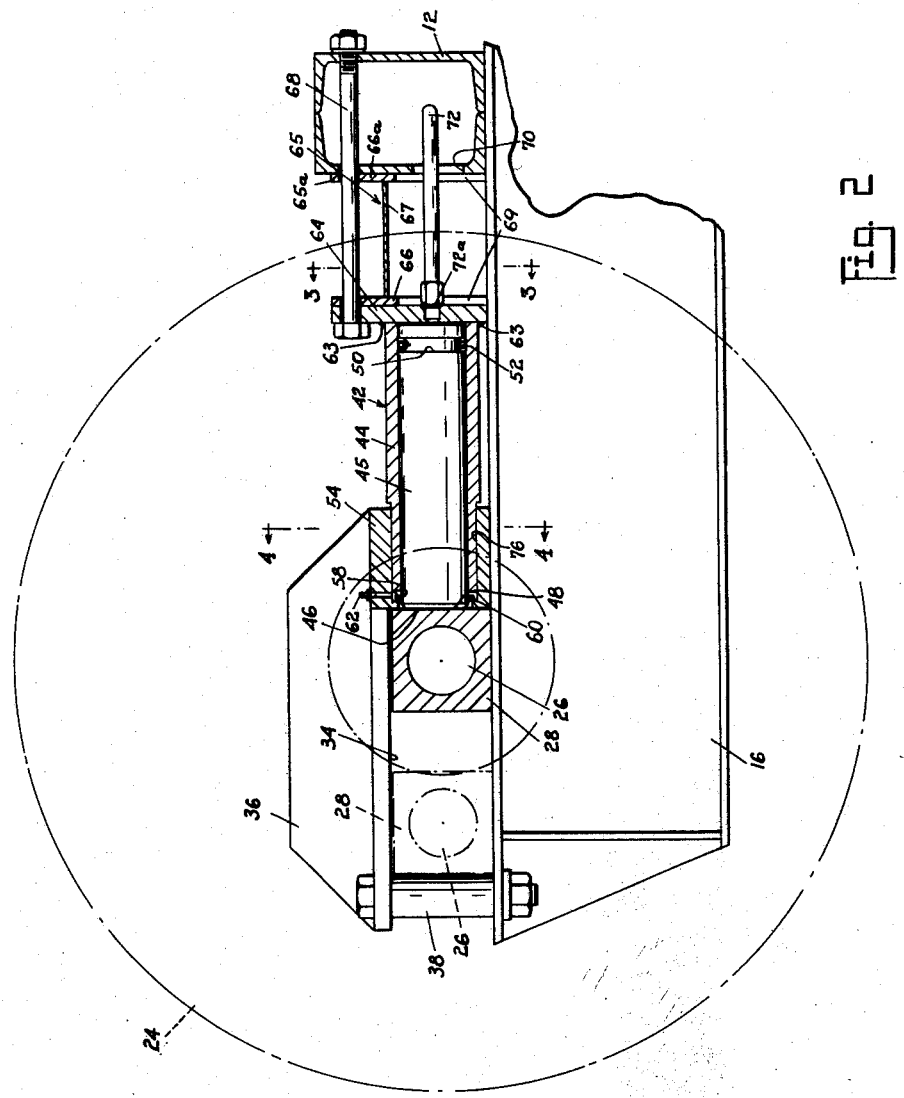
FIG. 2 is an enlarged, vertical sectional, fragmentary view of the cylinder means and its mounting arrangement on the crawler track mechanism, for actuating or moving the associated idler wheel of the track mechanism, in a manner to maintain the crawler track in predetermined adjusted and tensioned condition.

A fluid actuated piston and cylinder motor unit or ram 42 is mounted on opposite sides of wheel member 24 in supported relation on the respective frame member 16. Each ram member 42 includes a cylinder portion 44 (FIG. 2) and a reciprocal piston member 45 disposed in the associated cylinder portion for telescopic, reciprocal movement with respect thereto. The outer end 46 of each piston member of each motor unit 42 is adapted to engage the confronting inner side surface 48 of the respective bearing block 28 and be operative to move the bearing block outwardly toward the stop abutment 38, therefore taking up any slack in the crawler belt 19 and maintaining a predetermined tension thereon. The rear end of the piston member 45 is provided with an encircling groove 50 therein receiving resilient sealing means 52 for sealing the piston member with respect to the cylinder portion. The front end of the cylinder 44 in conjunction with portion 54 of structure 36 also may define a groove 58 and receive therein a wiper ring 60 of any suitable well known type, for engaging the piston portion of the motor unit. There may also be provided a lubricating fitting 62 communicating with groove 58 for facilitating anti-frictional movement of the piston portion with respect to the cylinder portion.

The cylinder is attached as by means of welding or the like, and as at 63, to an attaching plate 64 defining the rear end of the cylinder. Plate 64 is adapted to abut against mounting structure 65 which includes forward and rearward end plates 66 and 66a respectively, and an intermediate curved plate 67, thereby defining a horizontally extending column. The mounting structure 65 is adapted to be detachably secured to one of the cross members 12 of the frame of the excavating machine, as by means of elongated bolt and nut assembly 68. The front and rear plate members 66, 66a of mounting structure 65 are provided with openings 69 therethrough which are disposed in aligned relation with respect to an opening 70 extending through the front wall of the associated transverse member 12 of the framework. A fluid transmission line 72 is adapted to extend through such openings and be connected as at 72a to the cylinder portion of the motor unit, thereby supplying the latter with pressurized fluid from a source mounted on the vehicle. The front end of the cylinder 44 is more or less freely received in an opening 76 in portion 54 of structure 36, and it will be seen therefore that removal of bolt and nut assembly 68 permits ready removal of mounting structure 65, and thus ready removal of the fluid powered ram 42 for repair or replacement. Transmission line 72 may extend transversely through the associated cross member 12 to the source of pressurized fluid.

Figure 5:
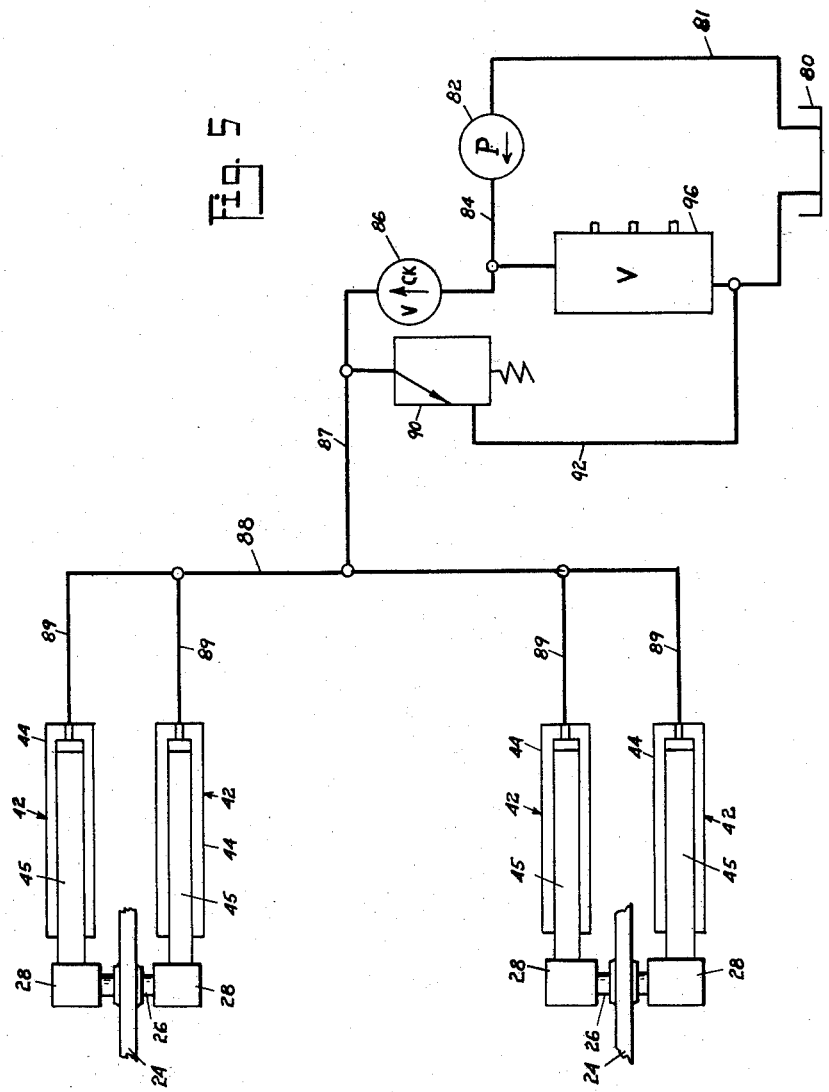
FIG. 5 is a schematic illustration of the novel fluid actuated, track adjusting system of the invention.

Referring now to FIG. 5, there is schematically illustrated a hydraulic system which may be utilized to furnish pressurized fluid to the track adjusting unit. Such hydraulic system may include a reservoir 80 connected by fluid transmission line 81 to a pump unit 82, which may be of the variable volume type. The pump unit may be driven from the main power unit of the vehicle in a manner well known in the art or by any other suitable means. The fluid transmission line 84 passes pressurized fluid from the pump through a check valve 86, thence through a fluid transmission line 87 to line 88 which supplies the hydraulic rams 42 mounted on either side of the respective idler wheel of the crawler mechanisms. It will be noted that the motor units 42 on either side of the wheel 24 are connected in parallel and upon flow of fluid pressure through lines 89 and into each of the motor units, the piston members 45 thereof are driven simultaneously outwardly, thereby shifting the bearing block on either side of the hub of the wheel 24 forwardly and in a direction to tension the crawler tracks. Now in accordance with the instant invention, there is provided a relief valve 90 which may be of any conventional well known type, which is coupled into the fluid transmission line 87 behind or after the aforementioned check valve 86, with such relief valve being coupled as by means of fluid transmission line 92 back to the reservoir 80 of the system. In operation, when any hydraulic function is performed on the vehicle by actuation of control valve mechanism 96, which may include a speed valve and a distributing valve, coacting in a known manner to apply a predetermined amount of pressurized fluid in a predetermined direction to a motor unit, and such as for instance actuation of the fluid motor powered crumbing mechanism, or actuation of the unloading conveyor either in its shifting movement to either side of a hydraulic excavating machine, or in its motor unit for driving the endless belt of the conveyor, fluid pressure is also applied to the track cylinders 44 and the track is automatically adjusted. In the event that an obstruction is encounered such as for instance a rock or a piece of wood being jammed between the idler wheel 24, or the sprocket wheel 22 and the links of the track, or if the tracks pack with mud and are moved outwardly as they attempt to pass around the sprocket members 22 of the track mechanism, the pressure will build up in the fluid system and the relief valve 90 will automatically open, thus permitting the excess pressure to pass via overflow line 92 back to the reservoir.

While the cylinders utilized in the system have been illustrated as being single acting, it will be understood that double acting cylinders could also be utilized, the principle of the system being the same. Moreover, the system would work if only one larger cylinder and a yoke engaging the bearing blocks on either side of the hub of the idler wheel 24 were utilized, in place of the two relatively small cylinders on each track assembly.

From the foregoing discussion and accompanying drawings it will be seen that the present invention provides a novel fluid actuated system for automatically adjusting the crawler tracks of a crawler supported vehicle, and with such system including pressure relief means embodied therein so that in the event that the pressure in the system builds up beyond a predetermined maximum, the pressure will be relieved via said pressure relief means, therefore preventing damage or separation of the crawler tracks. It will also be seen that the system provides an arrangement whereby the fluid powered actuating units are detachably mounted upon the excavating machine for convenient replacement and/or repair if need be.

The terms and expressions which have been used are used as terms of description and not of limitation and there is no intention in the use of such terms and expressions of excluding any equivalents of any of the features shown or described, or portions thereof, but it is recognized that various modifications are possible within the scope of the invention claimed.

I claim:

1. In a crawler supported vehicle, such as a mobile excavating machine, including a frame having at least one transversely extending cross member, endless belt tracks on opposite sides of said vehicle supporting said frame for movement along the ground, each of said tracks being supported between and extending around longitudinally spaced rotatable wheel-like members disposed at opposite ends of the respective track, means supporting said wheel-like members on said frame, the last mentioned support means including movable means mounting at least one of the wheel-like members on each side of the vehicle, for lengthwise movement with respect to the vehicle, said frame having an elongated slot on each side thereof for mounting a respective one of said movable means for lengthwise movement of the latter with respect to the vehicle, and means for simultaneously and uniformly adjusting the tension in each of said tracks, said means comprising a source of pressurized fluid, reciprocal fluid actuated motor means on said frame coacting with each of said movable means for moving the latter in a direction to tension the respective track, fluid transmitting means coupling said motor means in parallel, other fluid transmitting means coupling the first mentioned fluid transmitting means to said source, and fluid pressure relief means disposed between said source and said first mentioned fluid transmitting means for limiting the application of fluid pressure to said motor means to a predetermined maximum, and wherein each of said motor means is detachably mounted on said frame for ready removal and repair, each of said slots being defined by an inverted U-shaped structure secured to said frame, each of said U-shaped structures having a lengthwise extending opening in one end thereof communicating between the exterior of said U-shaped structure end and the respective slot, each of said motor means at one end thereof detachably extending through the respective opening in the respective U-shaped structure and projecting into the respective slot in engaged relation with the respective movable means, detachable abutment means at one end thereof engaging the other end of each of said motor means, the other end of said abutment means engaging said transversely extending cross member, and means detachably coupling said motor means and said abutment means to said cross member.

2. A crawler supported vehicle in accordance with claim 1 wherein said abutment means is apertured throughout its lengthwise extent with such aperture commencing at the bottom thereof, said cross member being hollow and being apertured in its confronting engagement with said other end of said abutment means, and said first mentioned fluid transmitting means extending through said cross member and through said abutment means into coupled fluid transmitting relation with said motor means, said abutment means being readily removable for ready removal of said motor means upon removal of said detachable coupling means.

References Cited in the file of this patent

UNITED STATES PATENTS

| | | |
|---|---|---|
| 2,374,240 | Shankman | Apr. 24, 1945 |
| 2,383,154 | Parsons | Aug. 28, 1945 |
| 2,426,342 | Couse | Aug. 26, 1947 |
| 2,818,311 | Ashley | Dec. 31, 1957 |
| 2,828,170 | Badgley | Mar. 25, 1958 |
| 2,837,379 | Selyem et al. | June 3, 1958 |
| 2,998,998 | Hyler et al. | Sept. 5, 1961 |

FOREIGN PATENTS

| | | |
|---|---|---|
| 940,561 | Germany | Mar. 22, 1956 |